Figure 1:
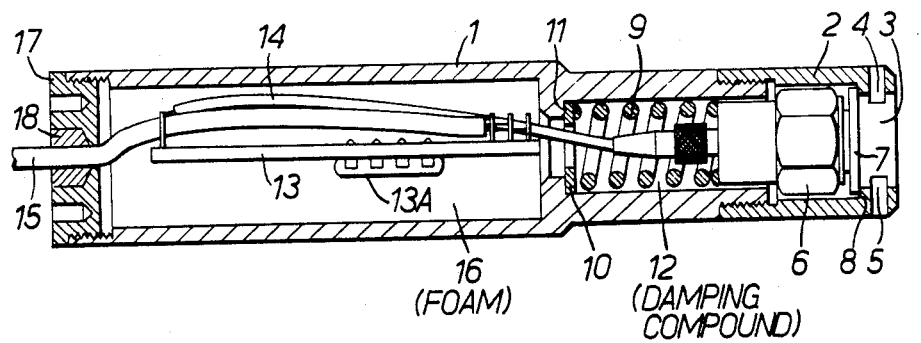

United States Patent [19]

Sheridan et al.

[11] Patent Number: 4,502,332
[45] Date of Patent: Mar. 5, 1985

[54] VIBRATION SENSING PROBE

[75] Inventors: Richard B. Sheridan, Colebrook; Robert W. Bogue, Lamerton near Tavistock, both of England

[73] Assignee: Gabriel Microwave Systems, Limited, Devon, England

[21] Appl. No.: 486,974

[22] Filed: Apr. 18, 1983

[30] Foreign Application Priority Data

Apr. 26, 1982 [GB] United Kingdom ............... 8212057

[51] Int. Cl.³ ............................................. G01N 29/00
[52] U.S. Cl. ............................................. 73/661; 73/35
[58] Field of Search .................... 73/593, 661, 660, 35

[56] References Cited

U.S. PATENT DOCUMENTS

| 2,764,020 | 9/1956 | Gadd | 73/661 |
| 3,490,270 | 1/1970 | Kleesattel | 73/661 |
| 4,016,752 | 4/1977 | Carey | 73/661 |
| 4,393,688 | 7/1983 | Johnston et al. | 73/35 |

FOREIGN PATENT DOCUMENTS 2946434 5/1981 Fed. Rep. of Germany .......... 73/35

Primary Examiner—Anthony V. Ciarlante
Attorney, Agent, or Firm—Mason, Fenwick & Lawrence

[57] ABSTRACT

A probe for producing electrical signals in response to the vibrations of the machine is attachable to a stud mounted on the machine by a bayonet fastening. When attached to the machine an accelerometer in the probe is held pressed against the stud by a helical spring within the probe. Spurious oscillations of the coils of the spring are damped out by the use of a polyurethane potting compound in which the spring is embedded. The probe includes an electrical signal amplifier for the signals from the accelerometer. As an alternative to the bayonet attachment, the use of a transverse movement is mentioned.

6 Claims, 3 Drawing Figures

VIBRATION SENSING PROBE

This invention relates to a vibration sensing probe and in particular to such a probe for producing electrical signals in response to the vibrations of a machine to which it is coupled.

In co-pending British Patent Application No. 82.06827, there is described vibration monitoring apparatus which responds to electrical signals derived by an accelerometer coupled to a machine, the levels of which electrical signals are compared with expected values and provide an indication of wear or incipient failure of a bearing or other component of the machine. As is described in the above specification, the accelerometer is firmly coupled to the machine at various places where it is considered that significant levels of vibration will occur, and the purpose of the probe carrying the accelerometer is to enable the operator quickly and effectively to couple the accelerometer to the different parts of the machine. Since the mechanical vibrations to be detected may be of as high a frequency as, say, 10 kHz, it is important that the coupling should be secure and free of backlash. In addition, the probe should be constructed so that it does not contribute spurious vibrations which may be detected by the accelerometer.

It is an object of the present invention to provide an improved vibration sensing probe.

According to the present invention there is provided a probe for producing electrical signals in response to the vibrations of a machine, the probe including a tubular portion having an open end shaped for mechanical engagement to a pick-up stud attached to a machine, the accelerometer located within the tubular portion and retained therein by abutment means adjacent the open end and spring means urging the accelerometer towards the open end and connections for conveying the electrical output signals from the accelerometer, in which the mechanical engagement of the probe to the stud is effected by an initial axial movement of the tubular portion so that the stud presses the accelerometer against the spring means and compresses it, followed by a locking operation to hold the tubular portion on the stud with the spring means compressed by the pressure of the stud on the accelerometer.

The locking operation may be a movement of the tubular portion transverse to or a rotation of the tubular portion about its axis relative to the stud, so that one or more pegs on one part engage with respective transverse or circumferential slots on the other part. The attachment of the probe to the stud may be by a bayonet fastening.

The spring means may be a helical spring embedded in a dense polyurethane potting compound so that the internal friction of the compound damps out parasitic oscillations of the spring which might otherwise be detected by the accelerometer.

The probe may include an electrical signal amplifier for the signals from the accelerometer, and the amplifier may be mounted in a vibration absorbent foam.

Figure 2:
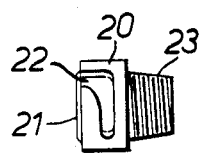
Figure 3:
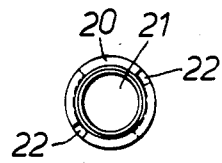

In order that the invention may be fully understood and readily carried into effect it will now be described with reference to the accompanying drawings, of which:

FIG. 1 shows partly in cross-section one example of a probe according to the invention; and FIGS. 2 and 3 show side and end views of a stud to be attached to a machine and which can be engaged by the probe shown in FIG. 1.

The probe shown in FIG. 1 has a body 1 of essentially tubular form with a tubular cap 2 screwed on to one end. The cap 2 has a circular hole 3 at its open end into which cylindrical pegs 4 and 5 project on opposite sides thereof. Within the cap 2 is located an accelerometer 6 which is a piezoelectric device of type QZP/T manufactured by Sensonics Limited. Other types of accelerometer may be used instead but the construction of the cap 2 and possibly of the body 1 may have to be different to accommodate it. The accelerometer 6 has attached to it a front face 7 to which vibration is to be applied, and this face 7 engages an annular abutment 8 on the cap 2. In order to press the accelerometer 6 towards the abutment 8 a helical spring 9 is provided which is compressed between the accelerometer 6 at one end and a washer 10 resting against an annular abutment 11 on the body 1 at the other end. The spring 9 is embedded in a dense polyurethane potting compound 12, which compound provides sufficient internal friction to damp out possible oscillations of the coils of the spring 9 due to vibration transmitted to it by the accelerometer 6. It will be appreciated that the accelerometer 6 could respond to such spurious oscillations of the coils of the spring 9 and produce erroneous results. An electrical signal amplifier mounted on a printed circuit board 13 is accommodated within the body 1 and is connected to the accelerometer 6 by a connector 14 which is of a specified length of a connector for accelerometer known by the trade name MICRODOT which is specially manufactured to eliminate tribo-electric charges. It will be appreciated that in use the accelerometer 6 will be subject to vibration, so that the connector 14 will be moving inside the body 1. A multi-way cable 15 is connected from the output of the amplifier on the printed circuit board 13 to the vibration monitoring apparatus. The cavity 16 in which the amplifier on the printed circit board 13, the connector 14 and part of the cable 15 are located, is filled with a vibration absorbing foam, for example of polyurethane. The back end of the body 1 is closed by a cap 17 including a clamp 18 for the cable 15, which clamp may be of suitably shaped plastics material.

The stud to which the probe shown in FIG. 1 is to be attached so that the accelerometer 6 can sense the vibration of the machine to which the stud is secured, is shown in FIGS. 2 and 3. It consists of a squat cylindrical head 20 having a flat raised circular anvil 21 forming most of its outer face and two L-shaped slots 22 in its curved walls for receiving the heads 4 and 5 of the probe so that the attachment of the probe to the stud is by a so-called bayonet fastening. The stud is secured to the machine by screwing its tapered threaded shank 23 into a threaded hole in the machine so that the stud is firmly attached to the machine. The stud may be arranged to leave a small gap between its head and the surface of the machine so that a small number plate may be held on the machine by the stud enabling the stud to be readily identified by an operator.

In the operation of a probe in accordance with the invention, the operator places the hole 3 over the stud and rotates it until the pegs 4 and 5 engage in the slots 22. The operator now presses the probe towards the stud so that the face 7 of the accelerometer 6 meets the anvil 21, and he then rotates the probe on the stud so that the pegs 4 and 5 move along the curved paths of the slots 22 which increases the pressure against the face 7 and lifts it clear off the abutment 8 by compressing the spring 9. In this position, it will be appreciated that the accelerometer 6 is held firmly in contact with the stud and is able to vibrate with it, whereas the remainder of the probe does not have to move with the stud because of the independent mounting of the accelerometer. This form of mounting of the accelerometer has the advantage that it can pick up vibrations of relatively high frequency, say 10 kHz, without having to use a particularly stiff spring to maintain its contact with the stud.

Although the invention has been described with reference to a specific embodiment, it will be appreciated that many modifications may be made to it without departing from the invention. For example, instead of a bayonet fastening of the probe to the stud, the probe may be of square form with slots in opposite sides and the probe may be arranged to engage the stud by a sideways movement on to the stud.

What we claim is:

1. A detachable probe for attachment to a pick-up stud attached to a machine to produce electrical signals in response to the vibrations of the part of the machine to which the stud is attached, the probe including a tubular portion having an open end shaped for mechanical engagement to the stud, an accelerometer located within the tubular portion and retained therein by abutment means adjacent the open end and spring means urging the accelerometer towards the open end and connections for conveying the electrical output signals from the accelerometer, the open end of the probe and the stud being so shaped that mechanical engagement of the probe to the stud is effected by an initial axial movement of the tubular portion bringing the accelerometer into direct contact with the stud followed by a locking operation to hold the probe on the stud, wherein when the probe is in engagement with the stud the accelerometer is held clear of the abutment means by the stud against which it is pressed by the spring means.

2. A probe according to claim 1 wherein the open end and the stud are so arranged that the locking operation is a movement of the tubular portion transverse to or rotation of the tubular portion about its axis relative to the stud so that one or more pegs on one part engage with respective transverse or circumferential slots on the other part.

3. A probe according to claim 2 wherein the attachment of the probe to the stud is by a bayonet fastening.

4. A probe according to claim 1 wherein the spring means is a helical spring and is provided with means for damping oscillations of the coils of the spring in response to vibrations applied to the accelerometer.

5. A probe according to claim 4 wherein the damping means is a dense polyurethane potting compound in which the spring is embedded.

6. A probe according to claim 1 including an electrical signal amplifier for amplifying the signals produced by the accelerometer.

* * * * *